No. 821,213. PATENTED MAY 22, 1906.
A. C. BIRKIN.
WHEEL FOR ROAD VEHICLES.
APPLICATION FILED MAR. 16, 1905.

UNITED STATES PATENT OFFICE.

ANNIE CULLEN BIRKIN, OF NOTTINGHAM, ENGLAND.

WHEEL FOR ROAD-VEHICLES.

No. 821,218.　　　　Specification of Letters Patent.　　　　Patented May 22, 1906.

Application filed March 16, 1905. Serial No. 250,415.

*To all whom it may concern:*

Be it known that I, ANNIE CULLEN BIRKIN, a subject of the King of Great Britain, and a resident of the city of Nottingham, in the county of Nottingham, England, have invented new and useful Improvements in Wheels for Road-Vehicles, of which the following is a specification.

This invention relates to improvements in wheels for road-vehicles, and has reference to wheels which are particularly applicable to mechanically-driven vehicles, the object of the invention being the construction of a wheel having a pneumatic tire so inclosed in a metal case that it is protected from puncture and damage without the resilience of the pneumatic tire being materially affected by the use of the metal case inclosing the same.

Figure 1:
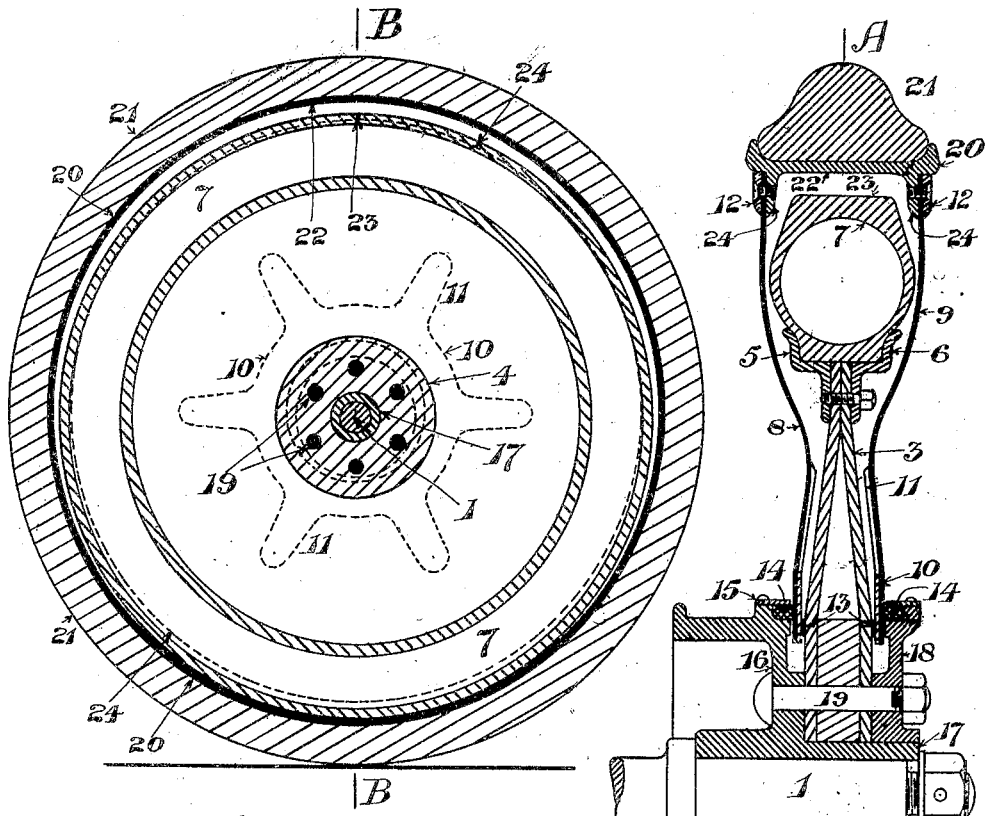
Figure 2:
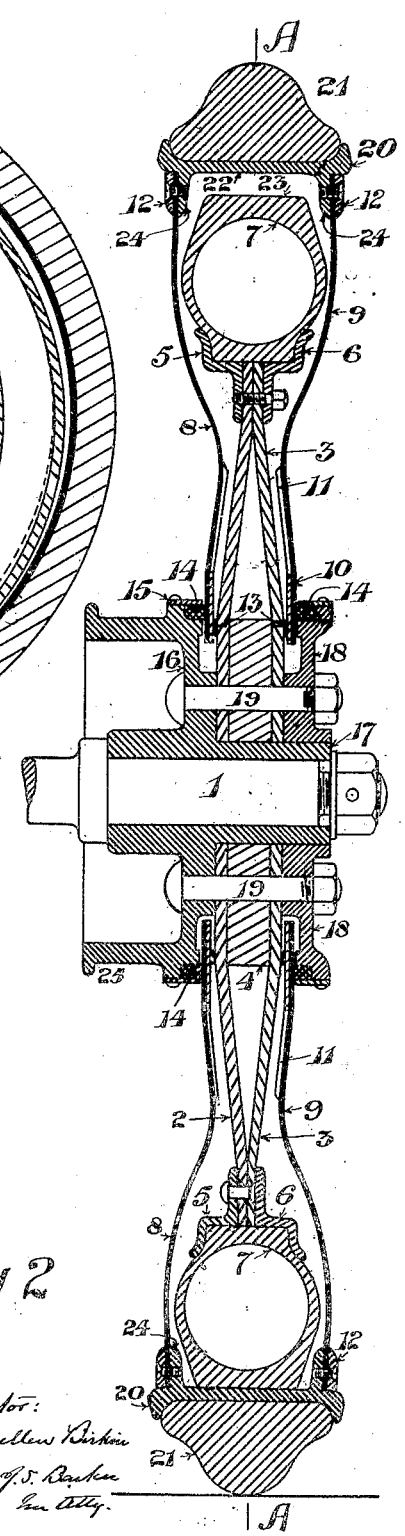

In the accompanying drawings, Figure 1 is a sectional elevation on the line A A, Fig. 2, of a wheel constructed according to this invention; and Fig. 2 is a section, to an enlarged scale, on the line B B, Fig. 1.

The drawings illustrate the construction of a motor-car wheel which is fitted to revolve with or upon its carrying-axle 1 and consists, essentially, of an inner disk-wheel, an outer disk-wheel, a pneumatic tire between the rims of the inner and outer wheels, and a rubber tire on the outside of the rim of the outer wheel.

The inner wheel is built up of two dished plates 2 and 3, which are at the center of the wheel riveted to each other, and a spacing-washer 4. The outer edges of the plates 2 and 3 are fitted with metal rings 5 and 6, which form the inner U-shaped rim, the ring 5 being riveted to the plates 2 and 3, while the ring 6 is attached by screws to allow of the pneumatic tire 7 being placed in position on the wheel.

The outer disk-wheel is built up of dished plates 8 and 9, which may be stiffened in the center by rings 10, having arms 11, and there is a ring 12 at the outer edge of each plate. The center portion of this wheel is fitted to slide easily between rings 13 on the plates 2 and 3, and a dirt-excluding packing 14, which on one side of the wheel is held by a ring 15 in a recess formed in a flange 16 on the wheel-sleeve 17 and at the other side of the wheel is held in a recess formed in a plate 18, which is secured with the inner wheel to the flange 16 by means of the bolts 19. It will be observed that the outer wheel moves radially relative to the inner wheel and its axis, and I provide means for supporting the outer wheel at the hub so as to allow these radial movements and for directing it in such movements. Such means consist of the flanges 16 and 18 on the hub, between which the plates of the outer-wheel casing are arranged. In a wheel structure such as mine, in which the inner wheel is provided with a pneumatic tire and the outer wheel is provided with an inclosing tread-surface that runs in contact with the tread of the pneumatic tire, it is not practicable to arrange the means for guiding and directing the radial movements of the outer wheel at the rim of the latter or at the rim of the inner wheel; but by arranging the guiding means, as I have done, at the hub the necessary freedom of movement is permitted and at the same time the outer wheel is controlled and guided in its radial movements. The outer edges of the plates 8 and 9 are secured to the outer rim 20, which is shaped to carry the rubber tread 21 and has its inner diameter 22 larger than the outer diameter 23 of the pneumatic tire 7, while the ribs 24 are of such a length that the outer circumference of the tire when inflated can never get under the edges of such ribs.

The flange 16 may also carry the brake-drum 25 and the driving-wheel or the improved wheel may be driven by the axle through keys or similar means. The drawings illustrate the application of a single-tube tire; but an ordinary air-tube and cover may be used, the shape of the rings 5 and 6 or their equivalent being modified according to the type of tire used, while the cover may be held in position by any of the usual means.

With a wheel of the kind herein described the plate 8 with the outer rim 20 attached thereto is first placed in position on the sleeve 17, after which the inner wheel with the ring 6 removed is added. This allows the pneumatic tire to be placed in position and fixed by the ring 6, after which the outer plate 9 is attached to the outer rim. The flange 18 is then bolted to the flange 16 and the tire inflated, for which purpose the plates 8 and 9 are provided with hand-holes and covers, so that the pump can readily be attached to the valve. When the wheel is built up and held horizontally, the outer rim 20, with its attached parts, can be moved in any direction relatively to the inner wheel, and when the wheel is in position on its axle the weight of the vehicle forces a portion of the lower part of the outer circumference 23 of the tire, into contact with a portion of the inner circumference 22 of the rim 20, and the shape of the tire is altered in the same way as an ordinary tire is when running on the ground, whereby the full resiliency of the tire is maintained, since it is not confined by any part of the metal case. Also the friction between the tire and rim is greater than the friction between the rubber tread 21 and the road, and the two wheels for the moment revolve as a single wheel. As the wheels rotate and a different part of the tire is brought into contact with a different part of the rim such part of the tire is altered in shape and gives the same effect as is obtained from an ordinary unprotected tire.

What I claim as my invention, and desire to secure by Letters Patent of the United States, is—

1. The combination with a hub, of a wheel secured to said hub, a casing entirely surrounding the wheel consisting of two resilient metallic plates, and a rim and tire secured to the peripheries of the plates, and radially-extending arms for strengthening the plates, substantially as set forth.

2. The combination with a hub provided with a flange on its inner end, of a wheel removably mounted on said hub, a casing surrounding the wheel consisting of a plate arranged between the wheel and the flange and having a rim and tire secured to its periphery, a plate on the opposite side of the wheel detachably secured to the said rim, whereby access to the wheel is permitted, a flange on the outer end of the hub, and means for clamping the flanges and wheel together for securing the wheel to the hub, substantially as set forth.

3. The combination with the hub having a flange on its inner end, of a wheel removably mounted on the hub, a flange secured to the outer end of the hub, means for securing the flanges and wheel together to hold the latter in place, there being annular recesses formed between the wheel and the said flanges, a casing surrounding the wheel arranged to have its inner edges slide radially in said recesses, and means arranged within the recesses for guiding the wheel in its movements, substantially as set forth.

In testimony whereof I have signed my name to this specification in the presence of two subscribing witnesses.

ANNIE CULLEN BIRKIN.

Witnesses:
H. D. JAMESON,
F. L. RAND.